(12) United States Patent
Novales et al.

(10) Patent No.: US 12,056,499 B2
(45) Date of Patent: Aug. 6, 2024

(54) HYPERVISOR REMOVAL

(71) Applicant: Imagination Technologies Limited, Kings Langley (GB)

(72) Inventors: Mario Sopena Novales, Hertfordshire (GB); Philip Morris, Hertfordshire (GB); Mihai Dragan, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 620 days.

(21) Appl. No.: 17/218,611

(22) Filed: Mar. 31, 2021

(65) Prior Publication Data

US 2021/0349734 A1 Nov. 11, 2021

(30) Foreign Application Priority Data

Mar. 31, 2020 (GB) .................................. 2004713

(51) Int. Cl.
*G06F 9/4401* (2018.01)
*G06F 9/30* (2018.01)
*G06T 1/20* (2006.01)

(52) U.S. Cl.
CPC ........ *G06F 9/4411* (2013.01); *G06F 9/30101* (2013.01); *G06T 1/20* (2013.01)

(58) Field of Classification Search
None
See application file for complete search history.

(56) References Cited

U.S. PATENT DOCUMENTS

2013/0174144 A1 7/2013 Cheng et al.
2017/0161204 A1* 6/2017 Roberts .................. G06F 13/16
(Continued)

FOREIGN PATENT DOCUMENTS

| CN | 107656845 A | 2/2018 |
|---|---|---|
| CN | 108600284 A | 9/2018 |
| GB | 2545170 A | 6/2017 |

OTHER PUBLICATIONS

De Souza et al., "Understanding Threats in a Cloud Infrastructure with No Hypervisor," World Congress on Internet Security 2013, pp. 128-133.

*Primary Examiner* — Frank D Mills
(74) *Attorney, Agent, or Firm* — Potomac Law Group, PLLC; Vincent M DeLuca

(57) ABSTRACT

A computer system has a plurality of operating systems, each operating system including a GPU driver; a graphics processing unit (GPU) including GPU firmware for controlling the execution of tasks at the graphics processing unit and, for each operating system: a firmware state register modifiable by the GPU firmware and indicating whether the GPU firmware is online; and an OS state register modifiable by the GPU driver of the respective operating system and indicating whether the GPU driver is online; and a memory management unit configured to mediate access to the registers of the GPU such that each operating system can access its respective registers but not those of other operating systems; wherein: one of the GPU drivers at the plurality of operating systems is a host GPU driver configured to initialise the GPU and bring the GPU firmware online; each GPU driver is configured to submit tasks for processing at the GPU only if its respective firmware state register indicates that the GPU firmware is online; and the GPU is configured to process tasks for an operating system if the respective OS state register of that operating system indicates that the GPU driver is online.

20 Claims, 8 Drawing Sheets

(56) References Cited

U.S. PATENT DOCUMENTS

| | | | |
|---|---|---|---|
| 2017/0329623 A1* | 11/2017 | Dong | G06T 1/20 |
| 2018/0011729 A1* | 1/2018 | Yu | G06F 9/4843 |
| 2019/0228557 A1* | 7/2019 | Ma | G06T 15/005 |
| 2020/0409732 A1* | 12/2020 | Kovacevic | G06F 9/30138 |
| 2022/0188965 A1* | 6/2022 | Li | G06F 9/5077 |

* cited by examiner

HYPERVISOR REMOVAL

BACKGROUND

The present disclosure relates to computer systems supporting a plurality of operating systems arranged to use a common graphics processing unit and to methods of booting and processing tasks at the graphics processing units of such systems without the need for a hypervisor.

Computer systems typically comprise a central processing unit (CPU) at which software processes execute, and a graphics processing unit (GPU) to which graphical processing tasks are submitted by the software processes. GPUs have a highly parallel structure which is well suited to performing graphics operations such as texture mapping and rendering polygons. Increasingly, GPUs are also used for other kinds of tasks which benefit from the parallel architecture, such as tensor calculations, neural network calculations, stream processing and vector processing.

Modern computer systems often support the execution of a number of virtual machines (VMs) which are supervised by a hypervisor (or Virtual Machine Manager, VMM) that controls access to the hardware by each VM and is responsible for enforcing security in the system. Such virtualised systems enable software to run on common hardware in independent software domains (the VMs). In a full virtualised architecture, the hypervisor abstracts the underlying hardware such that the virtual machines may be unmodified operating systems which are not aware of their virtualisation.

The use of a hypervisor introduces additional processing overheads in the form of additional calls to and from the hypervisor and/or context switches which can impact the performance of the system compared with non-virtualised systems. With a view to addressing some of the performance issues, a paravirtualised approach may be used in which the virtual machines are adapted to the virtualised architecture and interact with the hypervisor so as to improve performance. However, the hypervisor can still present a bottleneck, particularly where the hypervisor mediates access by a number of virtual machines to a common hardware resource such as a GPU.

UK Patent Application GB2545170A describes a paravirtualised approach in which each VM is allocated an identifier by the hypervisor which is used to tag GPU transactions by each VM on the system bus. This allows access to the GPU by the VMs to be mediated in part by hardware memory management units instead of the hypervisor, such that some transactions can be submitted directly to the GPU by VMs.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer system comprising:
  a plurality of operating systems, each operating system including a GPU driver;
  a graphics processing unit (GPU) including GPU firmware for controlling the execution of tasks at the graphics processing unit and, for each operating system:
    a firmware state register modifiable by the GPU firmware and indicating whether the GPU firmware is online; and
    an OS state register modifiable by the GPU driver of the respective operating system and indicating whether the GPU driver is online;
and
  a memory management unit configured to mediate access to the registers of the GPU such that each operating system can access its respective registers but not those of other operating systems;
wherein:
  one of the GPU drivers at the plurality of operating systems is a host GPU driver configured to initialise the GPU and bring the GPU firmware online;
  each GPU driver is configured to submit tasks for processing at the GPU only if its respective firmware state register indicates that the GPU firmware is online; and
  the GPU is configured to process tasks for an operating system if the respective OS state register of that operating system indicates that the GPU driver is online.

The GPU firmware may be configured to, responsive to its initialisation, modify the firmware state registers to indicate to the operating system that the GPU firmware is online.

Each GPU driver may be configured to, on loading at its operating system, modify its respective OS state register at the GPU to indicate that the GPU driver is online.

The host GPU driver may be configured to, on loading at its operating system, initialise the GPU firmware if its respective firmware state register indicates that the GPU firmware is not online.

The host GPU driver may be configured, on loading at its operating system, not to initialise the GPU firmware if its respective firmware state register indicates that the GPU firmware is online.

Each GPU driver may have write access to its respective OS state register and the GPU firmware may have read but not write access to the OS state registers.

The GPU firmware may have write access to the firmware state registers and the GPU drivers may have read but not write access to the firmware state registers.

All of the GPU drivers of the plurality of operating systems may be identical drivers, each operable in a host mode as the host GPU driver or a non-host mode in which the GPU driver is not configured to initialise the GPU.

The host GPU driver may be predefined at the plurality of operating systems.

The GPU further may comprise a kick register and a work queue for each of the plurality of operating systems, and each GPU driver is configured to write to its respective kick register when the GPU driver submits one or more tasks to its work queue.

The GPU may allocate an interrupt channel to each of the plurality of operating systems.

The GPU may have access to a timer and further comprising a watchdog process and, for each operating system, a firmware timer register and a OS return register, wherein: the watchdog process is configured to, for each operating system, periodically write the timer value into the firmware timer register; the GPU driver is configured to periodically copy the timer value in the firmware timer register into the OS return register; and the watchdog process is configured to, for each operating system, compare the OS return register to the firmware timer register so as to determine whether that operating system is online.

If the watchdog process determines that the operating system is not online, the GPU firmware may ignore any tasks scheduled for processing at the GPU for that operating system.

The watchdog process may be configured to perform its writing and comparing steps in respect of an operating system only while that operating system has tasks in a queue for processing at the GPU.

The memory management unit may be configured to additionally provide the host GPU driver with access to a set of configuration registers of the GPU and the host GPU driver is configured to initialise the GPU by writing to the configuration registers.

The computer system may not include a software communication channel between the plurality of operating system instances or a software communication channel between the operating systems and the GPU.

The computer system may further comprise a system firmware configured to, at bootup of the computer system, cause a bootloader to load each of the plurality of operating systems.

The computer system may further comprise a central processing unit (CPU) arranged to support the plurality of operating systems. The CPU may include one or more processing cores at which the plurality of operating systems run.

The computer system may not include a hypervisor or virtual machine manager for the plurality of operating systems.

The number of operating systems in the plurality of operating systems may be limited to the number of available pairs of firmware host registers and OS state registers at the GPU.

There is provided a method of booting a computer system which includes a central processing unit (CPU) for supporting a plurality of operating systems each including a GPU driver and a graphics processing unit (GPU) comprising GPU firmware for controlling the execution of tasks at the graphics processing unit and, for each operating system, a firmware state register modifiable by the GPU firmware and an OS state register modifiable by the GPU driver of the respective operating system, the method comprising:
  causing the plurality of operating systems to load at the CPU;
  configuring one or more memory management units of the computer system so as to allow each operating system to access its respective firmware and OS state registers at the GPU but not those of other operating systems;
  responsive to loading at its respective operating system, each GPU driver updating its respective OS state register at the GPU so as to indicate that the GPU driver is online;
  one of the GPU drivers at the plurality of operating systems acting as a host GPU driver by initialising the GPU so as to load the GPU firmware at the GPU; and
  responsive to loading at the GPU, the GPU firmware updating its firmware state register for each operating system so as to indicate that the GPU firmware is online;
wherein:
  each GPU driver is configured to submit tasks for processing at the GPU only if its respective firmware state register indicates that the GPU firmware is online; and
  the GPU is configured to process tasks for an operating system only if the respective OS state register of that operating system indicates that the GPU driver is online.

The configuring the one or more memory management units may include granting access to configuration registers of the GPU to one of the plurality of operating systems, each GPU driver being configured to, on loading at its operating system, determine whether it has access to the configuration registers, and, if a GPU driver has access to the configuration registers, that GPU driver configuring itself in host mode as the host GPU driver.

The computer system may be embodied in hardware on an integrated circuit. There may be provided a method of manufacturing, at an integrated circuit manufacturing system, the computer system. There may be provided an integrated circuit definition dataset that, when processed in an integrated circuit manufacturing system, configures the system to manufacture the computer system. There may be provided a non-transitory computer readable storage medium having stored thereon a computer readable description of an integrated circuit that, when processed in an integrated circuit manufacturing system, causes the integrated circuit manufacturing system to manufacture the computer system.

There may be provided an integrated circuit manufacturing system comprising: a non-transitory computer readable storage medium having stored thereon a computer readable integrated circuit description that describes the computer system; a layout processing system configured to process the integrated circuit description so as to generate a circuit layout description of an integrated circuit embodying the computer system; and an integrated circuit generation system configured to manufacture the computer system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

Figure 1:
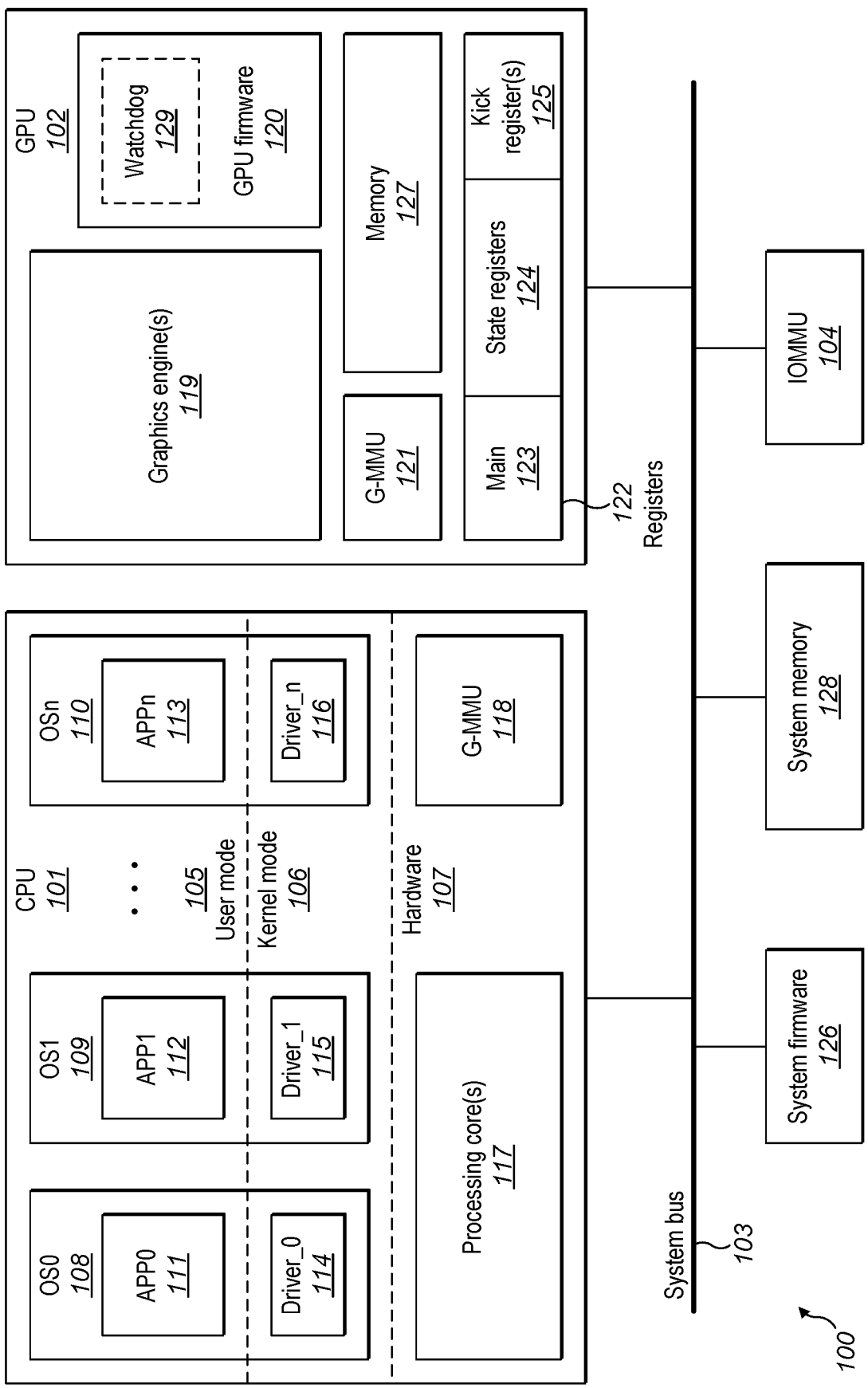
FIG. 1 is a schematic diagram of a computer system configured according to the principles described herein.

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As is described above, existing approaches to virtualisation require the hypervisor to manage all transactions between virtual machines and the GPU, or at least to mediate the interaction between the virtual machines and the GPU. Due to the additional processing overheads and additional layer between the software and hardware, these approaches can suffer from poor performance. Furthermore, unlike many CPUs, GPUs are generally not easily partitioned and so significant management is required to allow a number of virtual machines to make use of the same GPU. CPUs often support partitioning at the hardware level—for example, by providing multiple processing cores and/or multithreading. The partitioning problem can be circumvented by providing a dedicated GPU for each VM (i.e. by duplicating the entire GPU hardware). However, providing multiple GPUs increases the size (and hence cost) of the system and may be inefficient (e.g. where 8 GPUs are provided and fewer than 8 VMs are running).

In GPUs which support multiple independent contexts, one or more contexts may be dedicated to each VM. However, dedicating one or more contexts to each VM (a technique known as 'mediated pass-through') still involves the CPU in scheduling the work for the GPU across the VMs (which introduces latency of the round-trip to the CPU and consumes CPU resources).

Even approaches which use the hypervisor to manage direct communication paths to the GPU—for example, as described in UK Patent Application GB2545170A—the hypervisor still introduces additional processing overhead and cost both in terms of the resources consumed by the hypervisor and in the cost of licensing a hypervisor solution for a given application. Furthermore, when at least some of the VMs are running safety critical applications, both the hypervisor itself and the complex virtualized system as a whole must be trusted and certified to the same level as the safety critical software. This can further increase the cost of implementing a virtualised solution.

Described herein is a method of virtualization which enables a plurality of operating systems supported at a CPU to share a GPU without the need for a hypervisor. It is known to virtualize a plurality of operating systems at a CPU without a hypervisor—for example, Linux, Android and Integrity operating systems have the ability to virtualize a plurality of operating systems at a CPU without a hypervisor. As such, the method described herein enables computer systems comprising a GPU to support a plurality of operating systems without any kind of hypervisor being present in the system. In some implementations, some kind of trusted software component may be required to manage communications between the software domains and hardware other than the GPU.

FIG. 1 is a schematic diagram showing a computer system 100 which comprises a central processing unit (CPU) 101 supporting a plurality of operating systems 108-110, and a graphics processing unit (GPU) 102. The CPU includes one or more processing cores 117 at which the operating systems run. Each operating system (OS) includes one or more applications 111-113 and a GPU driver 114-116. Typically the operating system will include other drivers (e.g. for input devices, storage devices, etc), but for clarity only the GPU drivers are shown. The operating systems represent software domains supported by the CPU hardware 107 (e.g. its processing cores 117). In the example shown in FIG. 1, the software domain is split into a kernel mode 106 in which the GPU kernel mode drivers 114-116 execute, and a user mode 105 in which the applications 111-113 execute. Typically a GPU driver comprises a GPU kernel mode driver which runs in kernel mode and a GPU user mode driver portion which runs in user mode (not shown in the figure). In general, the CPU may have any architecture and may adopt any virtualization approach for supporting a plurality of operating systems.

The GPU 102 comprises one or more graphics engines 119 which perform graphical and/or vector and/or stream processing. For example, the graphics engines may perform graphical tasks such as geometry and fragment processing. At least some of the applications 111-113 may submit tasks to the GPU for processing. The GPU may have any suitable architecture. For example, the system could be operable to perform immediate mode rendering or tile-based rendering (including tile based deferred rendering), and/or any kind of graphics, image or video processing, and/or general processing. GPUs may be applied to general computing tasks, particularly those which can be readily parallelised. Examples of general computing applications include signal processing, audio processing, computer vision, physical simulations, statistical calculations, neural networks and cryptography.

The GPU includes firmware 120 for managing the execution of tasks at the graphics engines (e.g. scheduling tasks according to a predefined scheduling algorithm) and registers 122 which are accessible over system bus 103 to which the CPU and GPU are connected. For example, the registers may be allocated physical and/or virtual memory addresses such that other entities on the system bus (e.g. software running at the CPU) may read and/or write to the registers in accordance with the permissions granted to that entity by a memory management subsystem. The registers may comprise any kind of data storage element—for example, flip flops, SRAM, or non-volatile memory. The registers may be provided at a memory of the GPU. The system bus may be any kind of interconnect. In some examples, the CPU and GPU may be provided together in an integrated circuit (e.g. a System on Chip or SoC), and the system bus may comprise an on-chip interconnect.

The computer system 100 may also include system firmware 126—for example, a BIOS or UEFI which is configured to initialize hardware (e.g. the CPU, GPU and memory management units) during bootup of the system.

The computer system 100 includes one or more memory management units configured to mediate access to the memory address spaces of the system. In particular, the memory management units mediate access by the operating systems 108-110 to the registers 122 of the GPU. In FIG. 1, the computer system includes two stages of memory management units: IOMMU 104 which may comprise one or more root memory management units and is configured to translate between the guest physical addresses used by the operating systems and actual physical addresses on the system bus; G-MMU 118 at the CPU which translates between virtual addresses used by the applications running at the operating systems and guest physical addresses; and G-MMU 121 at the GPU which translates between guest physical addresses and virtual addresses known to the tasks submitted to the graphics engines by the applications. The operation of the two-stage MMUs is described in more detail below, but the approach will be understood from the art. Each MMU may perform other memory management functions in addition to translation of memory addresses.

Although FIG. 1 shows the IOMMU 104 as being external to the CPU and GPU, more generally the IOMMU may comprise one or more components, some or all of which may be at the CPU and/or GPU.

Figure 2:
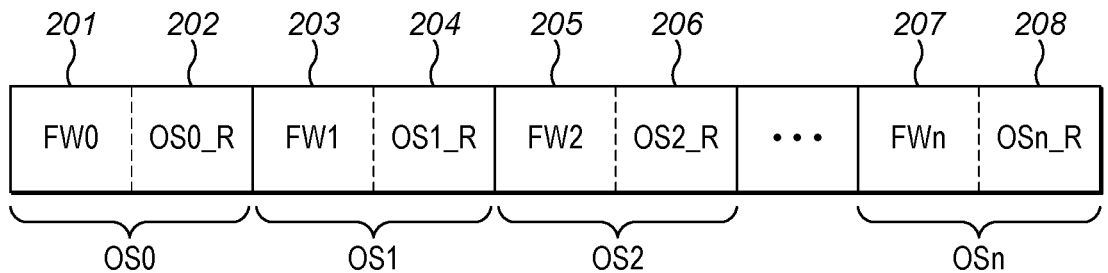
FIG. 2 shows a set of state registers provided at the GPU for a plurality of operating systems.

The registers 122 include a set of state registers 124 which enable the plurality of operating systems 108-110 to share the GPU without the need for a hypervisor at the CPU to manage access to the GPU by the operating systems. An exemplary set of state registers 124 is shown in FIG. 2. Each operating system OS0 through to OSn has a set of state registers at the GPU. In the example shown in FIG. 2, each operating system has a pair of registers: a firmware state register and an OS state register as is described below. In the figure, OS0 has registers 201 and 202; OS1 has registers 203 and 204; OS2 has registers 205 and 206; through to OSn which has registers 207 and 208. In this example there are n+1 operating systems. More generally, each operating system may have more than two registers.

Each operating system has a firmware state register (201, 203, 205, 207) which indicates to the respective operating system whether the GPU firmware is online such that the GPU may receive tasks from applications running at the operating system and an OS state register (202, 204, 206, 208) which indicates to the GPU whether the respective operating system is online such that applications running at the operating system may send tasks to the GPU for processing. In the figure, OS0 has firmware state register 201 and OS state register 202, OS1 has firmware state register 203 and OS state register 204, and so on.

Each operating system is only permitted to access its own pair of state registers and not those of any other operating system. This maintains security between the software domains and prevents an unstable or compromised operating system corrupting the registers of other operating systems. Access to the registers is controlled by the memory management units such that memory transactions by an operating system can address its own pair of state registers but the registers of other operating systems are outside its addressable memory. The mappings at the memory management units may be established in any suitable manner. For example, the system firmware may initialise the IOMMU 104 so as to define mappings between the guest physical address spaces available to the operating systems 108-110 and the actual physical address space used on the system bus. In some embodiments there may be a fixed set of memory resources available to each operating system. This enables the mappings between guest and actual physical addresses to be predefined and loaded into the IOMMU at bootup—for example, by the system firmware. Kernel mode components of the operating systems (e.g. the operating system kernels) and/or the drivers 114-116 may be configured to define mappings at the G-MMUs 118 and 121 between the virtual address spaces of the applications 111-113 and the guest physical address spaces of the respective operating system at which that application is supported. Such mappings could be established at the G-MMUs in response to requests from applications for resources.

By controlling the translations performed at the IOMMU, the computer system (e.g. its system firmware) controls which operating systems have access to each resource on the system bus 103. And by controlling the translations performed at the G-MMU, each operating system can control which applications are able to access the resources available to that operating system.

Each of the sets of GPU state registers 124 allocated to an operating system may, for example, consume 64 kB of space in the system physical address space map. This granularity may be selected to match the granularity of the IOMMU. It will be appreciated that the computer system 100 may also comprise one or more memories addressable over the system bus—for example, the computer system would typically include a system memory 128 to which the CPU and GPU have access.

Each operating system may be further provided an interrupt channel by the GPU firmware. As appropriate to the architecture, each interrupt channel may permit unidirectional (e.g. interrupts from the operating system to the GPU, or vice versa) or bidirectional interrupts (e.g. interrupts in both directions between the operating system and the GPU). This enables each operating system to request and/or respond to interrupts independently of any other operating system.

The operation of the state registers 124 so as to enable multiple operating systems to use a single GPU will now be described in more detail. Each set of state registers for an operating system includes a firmware state register and an OS state register. For example, in FIG. 2 the firmware and OS state registers for operating system OS0 are 201 and 202. The firmware state registers may be modified by the GPU firmware 120 but in some examples may not be modified by the respective operating system (and recall that no other operating systems has access to the state registers of other operating systems since the registers lie outside their address spaces). The firmware state registers may be configured such that only the GPU firmware 120 has write access to the firmware state registers.

The OS state registers may be modified by the GPU driver of the corresponding operating system (e.g. OS state register 202 can be modified by operating system OS0) but are not modified by the GPU firmware 120. In some examples, the GPU firmware may be able to perform functions which have the result that the OS state registers are modified (e.g. resetting the GPU such that its registers 122 are reinitialised) but during normal operation the GPU is preferably not configured to modify the OS state registers (e.g. the GPU firmware may not have write access to the OS state registers). The OS state registers may be configured such that only the corresponding operating system has write access.

In some examples, the firmware state and OS state registers may be located within a single page of memory. Since access permissions are typically at page granularity, in such examples it is not possible to protect against the firmware state register being written to by the OS because the OS needs write access to its adjacent OS state register. One solution to this is to mirror the firmware state register in memory which is only accessible to the firmware, and for the firmware to then only ever write to the firmware state register and never read from it. For example, the firmware reads from its internal state which mirrors the firmware state register and, when that internal state changes, the firmware writes to the firmware state register. In this solution the firmware may periodically refresh the firmware state register from its internal state, to mitigate any spurious writes to the register from software components within the OS.

Each of the operating systems at the computer system may support one or more applications with tasks for processing at the GPU. Typically, an application will prepare tasks for processing at a GPU by making one or more calls to the GPU driver at the operating system so as to cause, for example, the GPU driver to write out the task to a memory accessible to the GPU and an identifier of the task to a work queue of the GPU. As is described below, in order to submit tasks to the GPU, the GPU driver may write to a kick register so as to cause the GPU to begin processing of its tasks. Prior to a task being submitted to the GPU, each GPU driver is configured to check that its respective firmware state register indicates that the GPU firmware is online. The GPU firmware is online when it has been initialised and is able to manage the execution of tasks at the GPU. Only if the GPU firmware is online does the GPU driver submit the task. If the GPU firmware is not online, the GPU driver waits for the GPU firmware to enter its online state. This approach avoids the need for a trusted agent at the CPU (e.g. a hypervisor) to monitor the GPU and mediate task submission by the operating systems running at the CPU.

The GPU firmware is configured to cause the GPU to process tasks if the OS state register for the operating system from which the task originated indicates that the GPU driver of that operating system is online. In some examples, the GPU firmware may be configured to check the state of the OS state register corresponding to a task prior to scheduling the execution of that task at the graphics engines 119 of the GPU. In some examples, the GPU firmware may be configured to schedule the execution of a task submitted by a GPU driver while the state of the respective OS state register indicates that the GPU driver is online. If the OS state register indicates that the GPU driver is not online (e.g. the OS state register is not in the READY or ACTIVE states shown in FIG. 4 which is discussed below) then the GPU firmware may ignore or abort the task.

The number of operating systems which may be supported at one time by the GPU may be limited to the number of available state registers pairs at the set of state registers 124. For example, the GPU may provide 8 pairs of firmware and OS state registers such that 8 operating systems at the CPU may utilise the GPU in accordance with the principles described herein. In some examples, the state registers are fixed hardware registers. In other examples, the state registers are defined in memory, with registers being defined as required by operating systems loaded at the CPU.

The approach described herein is particularly suitable for computer systems having a fixed set of operating systems—e.g. systems having a predefined application such as embedded systems. For example, a computer system for a vehicle is typically a closed system which may have a predefined set of applications which it can be advantageous to run in different operating systems. Applications in a vehicle may relate to very different vehicle functions, all of which might make use of the processing capabilities of a GPU: e.g. the entertainment system; controllers for a graphical dashboard display; controllers for the vehicle engine and other low level systems; processing information received from vehicle sensors such as cameras, RADAR or LIDAR sensors; running driver-assistance systems such as collision avoidance, hazard awareness, lane position guidance, etc. Some applications may relate to safety critical functions (e.g. the dashboard, driver-assistance systems), whilst others may be non-safety critical (e.g. the entertainment and air conditioning systems).

It is advantageous to separate safety critical and non-safety critical applications into separate operating systems so that crashes or other issues with the non-safety critical applications are isolated from the safety critical applications.

It is further advantageous to separate different safety critical systems from one another so that any issues or crashes with one safety critical system are isolated. Nevertheless, at least some of the safety and non-safety critical applications may require access to a GPU. Consequently, it is particularly helpful in the automotive context to be able to separate different applications into different operating systems whilst providing an efficient mechanism for those applications to access a common GPU.

A further advantage is that, because safety critical software domains (e.g. an operating system and its applications) may communicate directly with the GPU without the need for a hypervisor, it is not necessary to go to the expense and complexity of testing and certifying a hypervisor to meet some predefined safety level. In conventional virtualised systems which include safety critical applications, the hypervisor must be certified to the same safety level as the safety-critical applications because the safety-critical applications rely on the correct functioning of the hypervisor.

At first boot of the computer system 100, the system firmware 126 will typically initialise the hardware and perform various checks. The firmware 126 may also cause one or more of the operating systems to load—e.g. by running a bootloader at the CPU 101 which is configured to boot one or more operating systems according to some predefined sequence. Each of the operating systems includes a GPU driver which typically loads with the operating system. One of the GPU drivers is configured to be a host GPU driver which initialises the GPU. The GPU initialisation may be performed in the usual way by the host GPU driver—for example, the host GPU driver causes the GPU firmware 120 to load and initialises various configuration registers of the GPU. In FIG. 1, the configuration registers of the GPU are the set of main configuration registers 123. In order to initialise the GPU, the host GPU driver requires access to the main configuration registers 123 and so the operating system comprising the host GPU driver is granted access to the main registers 123. That operating system may be termed the host operating system. Preferably no other operating systems would be granted access to the main registers—e.g. the physical addresses of the main registers would not be mapped into the guest physical address spaces of the operating systems which do not include the host GPU driver.

The host GPU driver and the host operating system which supports the host GPU driver do not control access to the GPU by the other operating systems in the manner of a hypervisor. For example, communications between each operating system and the GPU do not pass through the host operating system, and the host operating system need not provide any kind of abstraction of the GPU hardware to the other operating systems. Each operating system has independent access to the GPU over the system bus by virtue of the state registers 124 which are described in more detail below. Effectively, the state registers enable the GPU to present as multiple GPUs such that each operating system may independently use the GPU.

In some embodiments, the guest physical address space for each operating system is predefined such that the operating system which includes the host GPU driver is allocated access to the main registers 123 of the GPU. For example, the IOMMU may be programmed with a predetermined set of address space mappings that enable the operating system that includes the host GPU driver to access the main registers.

The operating system which includes the host GPU driver may be the first operating system to be booted. For example, in FIG. 1, OS0 may be the first operating system to be booted by a bootloader which runs at the CPU at bootup of the computer system, with the operating system OS0 being allocated a guest physical address space which includes access to the main registers 123 and Driver_0 being the host GPU driver. Operating systems which subsequently load may then be allocated other predefined physical address spaces which do not include access to the main registers.

Each operating system may be allocated an OS_ID identifier which is used to tag transactions on the system bus. GPU tasks submitted over the system bus 103 to the GPU 102 by each operating system may be tagged with the OS_ID of that respective operating system. The OS_ID may be used to enable the GPU to identify which operating system each task relates to. The OS_ID may be used in translation tables held at the memory management units (e.g. IOMMU 104) such that translations between guest and actual physical addresses may be performed in dependence on the OS_ID. Since each transaction is tagged with the OS_ID, for an OS_ID of bit length m bits, the OS_IDs effectively provide m more bits of address space so as to identify the particular operating system to which each transaction relates. The translation tables at the IOMMU could be indexed or selected by the IOMMU according to OS_ID.

The OS_ID may be allocated at bootup—for example, by the system firmware 126 or a bootloader which starts up the operating systems. In some examples, the OS_ID allocated to each operating system is fixed such that the same operating system receives the same ID at each boot. In some examples, the OS_ID is allocated in the order in which the operating systems boot—e.g. in the event that any one of the GPU drivers at the operating systems can act as host GPU driver.

In some embodiments, all of the GPU drivers of the operating systems are the same and include the functionality to act as host GPU driver. One of the drivers is appointed as host GPU driver and it is advantageous if this appointment does not require any communication between the operating systems so as to avoid the need for a communication path between the operating systems. For example, when a GPU driver loads it may check to see if it has access to the main registers of the GPU. If it does not have access to the main registers, the GPU driver can assume that it is not the host GPU driver. If it can access the main registers, then the GPU driver assumes that it is the host GPU driver. Each GPU driver may thus self-determine whether it is to act in a host mode or a non-host mode. In this manner, a host GPU driver can be appointed by the memory management units without requiring communication between the operating systems. In some examples, the host GPU driver is the GPU driver of the operating system which is allocated a particular OS_ID, with the GPU driver of the operating system allocated that OS_ID configuring itself to operate in host mode.

By avoiding the need for a software communication channel both between operating systems and between the operating systems and the GPU, the computer system is rendered less susceptible to malicious attacks since there is no longer a single software entity (e.g. a hypervisor) which has access to all of the software domains.

The GPU 102 further comprises a memory 127 into which tasks are received for processing at the one or more graphics engines 119. For example, the memory may include one or more queues into which tasks are received. In some examples there may be one or more queues per operating system—e.g. there could be a separate work queue for each application. In some examples there may be a single queue to which all of the operating systems submit tasks—an identifier (e.g. the OS_ID mentioned above) may be used to indicate which operating system each task relates to.

Tasks may be submitted to the GPU for processing in any suitable manner, as is appropriate to the particular architecture of the GPU. Typically, in order to submit a task to the GPU for processing, an application running at one of the operating systems will make one or more calls to the GPU driver at that operating system which will then write the data to be processed out to a memory accessible to the GPU—e.g. system memory 128 or GPU memory 127. When some or all of the data relating to the task is ready for processing (e.g. has been written out to system memory 128 or GPU memory 127), the driver may indicate to the GPU that the task is ready for processing. For example, the driver may write to a 'kick' register 125 to indicate to the GPU that it has one or more tasks ready for processing. The driver may set a flag at the kick register (e.g. a binary flag) indicating that a task is available at a task queue of the GPU. In some examples there is a single kick register for the GPU to which all of the operating systems have access—this can be appropriate if there is a single task queue. In other examples there is a kick register for each operating system. Each kick register could be made available to an operating system in the same manner as the firmware and OS state registers—e.g. mapped into the guest address spaces of the corresponding operating system and not available to other operating systems. This arrangement can be appropriate if there is a task queue for each operating system: the kick register indicates to the GPU that tasks are ready for processing at the particular queue of the operating system to which the kick register belongs.

A task may be any portion of work for processing at the GPU, including all or part of a scene for rendering, all or part of an image or video frame, or any other data. A task for a graphical processing application may relate to any aspect of graphics processing, including tiling, geometry calculations, texture mapping, shading, anti-aliasing, ray tracing, pixelization and tessellation. In tiled renderers, each task may relate to a tile. More generally a task need not relate to the processing of graphical data. For example, a task may be any kind of data which the processing units of a graphics processing system may be configured to process, such as vector data. A graphics processing system may be configured to operate on a plurality of different types of task. In some architectures, different processing units or groups of processing units may be allocated to process different types of task.

Figure 3:
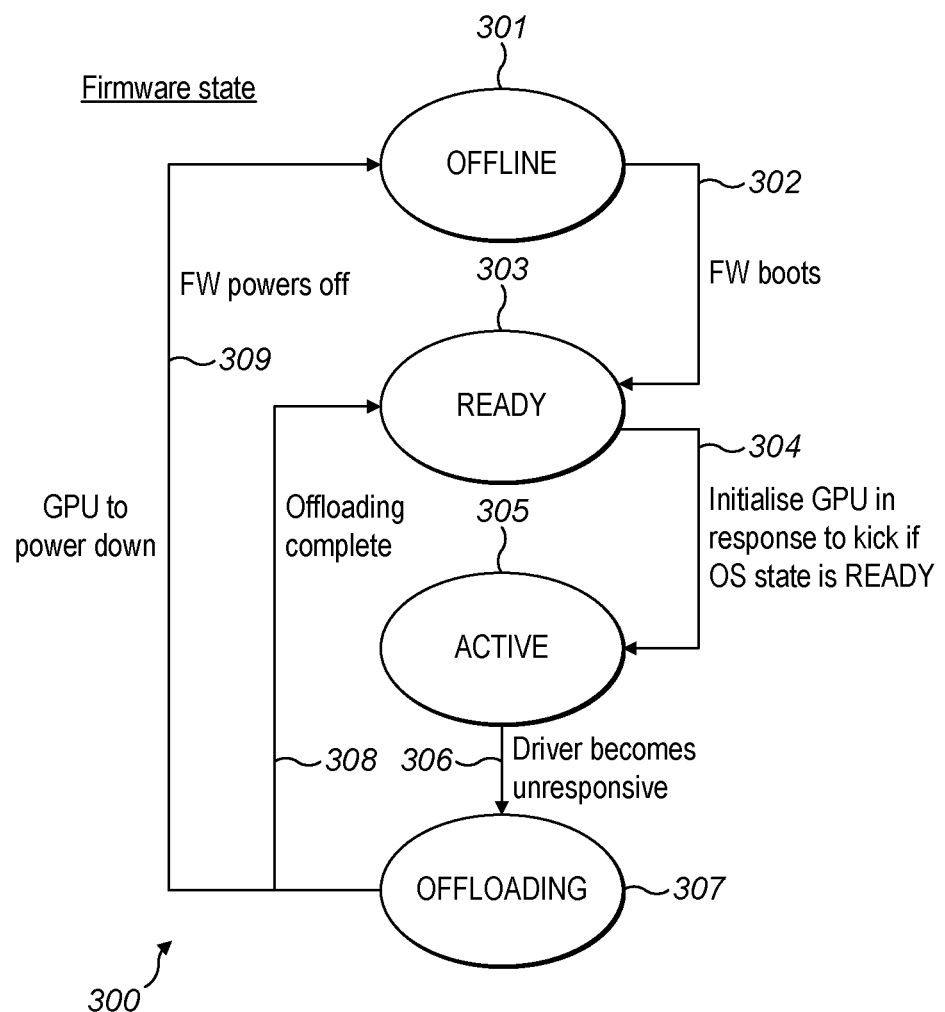
FIG. 3 is an exemplary state diagram for a firmware state register.
Figure 4:
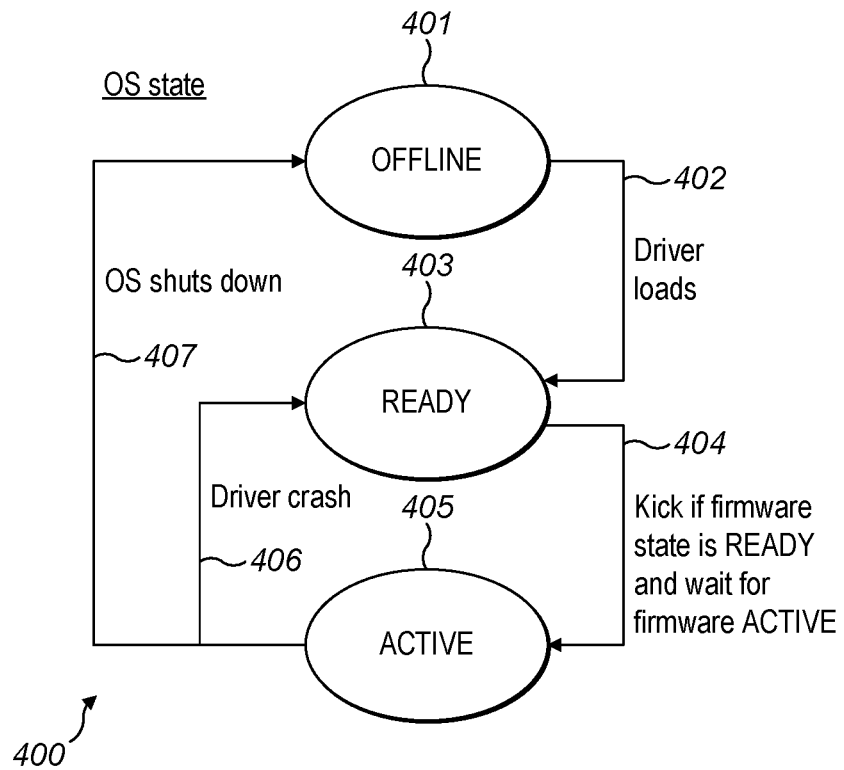
FIG. 4 is an exemplary state diagram for an OS state register.

The operation of the firmware and OS state registers provided at the GPU for each operating system is shown in FIGS. 3 and 4, respectively, and will now be described in more detail.

FIG. 3 is an exemplary state diagram 300 for a firmware state register provided at the GPU for an operating system. At bootup of the computer system, the firmware state is in the OFFLINE state 301. At bootup 302 of the host operating system, the GPU firmware is loaded and the OS state register is initialised by the host GPU driver (e.g. Driver_0 at OS0). Once initialised, the firmware state register is transitioned to the READY state 303 by the GPU firmware 120. In the READY state the GPU is operable to receive the first task for processing from the applications running at the respective operating system. When a task from an application is ready for processing, the GPU driver provided at the operating system at which the application is supported writes to its kick register so as to cause the GPU to begin processing the first task. For the first kick, the GPU firmware 120 may check that the corresponding OS state register is READY and perform one-off initialisation of the GPU 304 for the GPU driver. The GPU firmware 120 then updates the firmware state register to ACTIVE 305 to indicate that future tasks will be accepted from the GPU driver, and a normal mode of operation ensues. Subsequent tasks submitted do not require the firmware to perform any initialisation, as indicated by the firmware state register presented to the GPU driver already signalling ACTIVE e.g. its readiness to accept tasks from the driver for processing. The GPU driver may check that both the firmware state register and the OS state registers (see below) are READY for the first kick, or ACTIVE for subsequent kicks, prior to writing to the kick register.

When the GPU powers down, the firmware offloads 307 all state data for the operating systems including the host operating system and updates the firmware state register of all operating systems to OFFLINE 301.

FIG. 4 is an exemplary state diagram 400 for an OS state register provided at the GPU for an operating system. At bootup of the computer system the host state is OFFLINE 401. When each GPU driver loads 402, the driver updates the state of its respective OS state register to READY 403. This indicates that the driver is ready to submit tasks to the GPU. When a first task from an application is ready for processing, the GPU driver provided at the operating system at which the application is supported writes to its kick register 404 so as to cause the GPU to begin processing that first task. The GPU driver then waits for its corresponding firmware state register to enter ACTIVE 305, then updates the host state to ACTIVE 405 to indicate that the GPU driver is now in a normal mode of operation.

In the event that the GPU driver is unloaded or the operating system shuts down 407, the GPU driver updates the OS state register to OFFLINE 401. If the OS crashes or the GPU driver otherwise does not shutdown cleanly, the OS state register will remain ACTIVE and on driver re-initialisation the GPU driver will transition its OS state register to READY. The OS state does not go through its OFFLINE state.

The firmware and OS state registers specific to each operating system operate in the same manner for all of the operating systems 108-110, with the operating systems operating independently of one another. The operating systems and their GPU drivers may freely load and unload without affecting the other operating systems running at the computer system. The use of the firmware and OS state registers in the manner described herein allows even the host GPU driver (e.g. driver_0 in FIG. 1) to be unloaded and/or the host operating system (e.g. OS0 in FIG. 1) to be shut down without interrupting the operation of the other operating systems (e.g. OS1 to OSn in FIG. 1). The host GPU driver is required to perform configuration of the GPU, such as initialisation of the GPU at bootup, but is not involved in the independent communication with the GPU by the GPU drivers of other operating systems.

Should the host GPU driver end up offline, the state registers of the other operating systems which do not include the host GPU driver are not affected. In addition, the firmware state register for the host operating system is not affected: this state is set by the GPU firmware 120, not the host GPU driver, and will not transition to the OFFLINE state unless the GPU itself is rebooted/powered down. When the host GPU driver restarts (e.g. through the driver being reloaded after a crash, or the entire host operating system being restarted including the host GPU driver), the host GPU driver checks its firmware state register to identify whether the GPU firmware is online. If the firmware state register is already in the READY state (e.g. because host GPU driver crashed but not the GPU itself) then the host GPU driver will not attempt to initialise the GPU (the GPU is already initialised). The host GPU driver will simply transition 402 its OS state register from OFFLINE to READY. When both the firmware and OS state register for the host operating system have the state READY, the host GPU driver can submit the first task to the GPU for processing. The firmware state register, and OS state register for the host operating system are then able to transition to ACTIVE as described above, assuming no other issues are encountered.

From time to time software may crash or become unresponsive. The approach described herein is particularly robust since there is no hypervisor in which a crash could render the entire computer system unresponsive, and operating systems can continue to submit tasks to the GPU if any of the GPU drivers crashes—including the host GPU driver which initialises the GPU. If a GPU driver at an operating system crashes or becomes unresponsive then that driver will be unable to modify its host state and will not be able to gracefully update its state to OFFLINE. Should a GPU driver crash when the GPU is scheduled to process one or more of its tasks, its OS state register may end up stuck in its ACTIVE state (see FIG. 4). When a GPU driver loads, and once initialisation is complete, it transitions 406 its state to READY and is ready once again to begin submitting tasks to the firmware.

It is advantageous if the GPU firmware can detect when a GPU driver (or the operating system at which it is supported) crashes or becomes unresponsive. This enables the GPU firmware to kill any tasks which are being processed for that GPU driver and transition 306 the corresponding firmware state register from its ACTIVE state 305 to its OFFLOADING state 307 (and subsequently back to the READY state 303 when offloading is complete). The firmware may ignore any tasks which are queued for an OS which has become unresponsive—typically these tasks will be flushed when the GPU driver for the OS reinitialises. This avoids the GPU wasting resources by performing unnecessary work and avoids the GPU becoming locked up waiting for the GPU driver—e.g. waiting for the GPU driver to provide further data relating to a task. It also prevents the GPU accessing any memory which may, on OS reboot, be re-assigned for other purposes within the OS. This guards against a potential source of random memory corruption, which is difficult to detect and debug.

Figure 5:
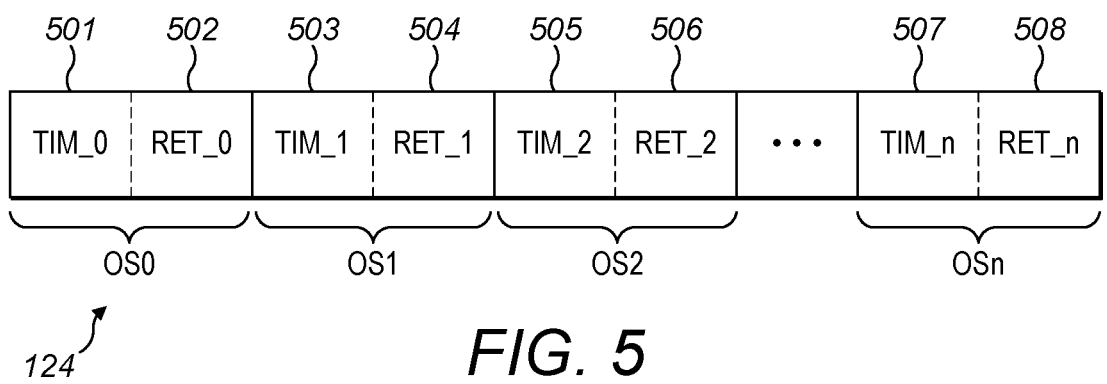
FIG. 5 shows a further set of state registers which may be provided at the GPU for a plurality of operating systems and used by a watchdog to determine when GPU drivers become unresponsive.

A watchdog process 129 may be provided at the GPU firmware 120 to detect when an operating system has crashed, shuts down or has become unresponsive. The watchdog process has access to a timer at the GPU. FIG. 5 illustrates an additional set of registers at the state register bank 124 for use in the watchdog mechanism. For each operating system, a further pair of registers are provided: a firmware timer register (501, 503, 505, 507) and a OS return register (502, 504, 506, 508). The watchdog process 129 utilises the pair of registers for a given operating system as follows:

1. At a watchdog event, the watchdog periodically writes a GPU timer value into the firmware timer register for an operating system. This period may be predefined at the watchdog.
2. The GPU driver of the operating system periodically reads the timer value from the firmware timer register and writes that timer value back into the OS return register for the operating system. This period is preferably the same period according to which the watchdog periodically writes to the firmware timer register, but as measured according to timers available at the CPU at which the GPU driver is running.

3. On the next watchdog event, prior to writing a new timer value into the firmware timer register, the watchdog checks whether the timer value in the OS return register matches the value in the firmware timer register (and therefore that the GPU driver has written back the timer value). If the values match, the watchdog concludes that the GPU driver is online. The watchdog then updates the firmware timer register with the current timer value and the cycle repeats.

4. If the timer value in the OS return register does not match the value in the firmware timer register, the watchdog concludes that the GPU driver is offline. In response, and with reference to FIG. 3, the watchdog causes the GPU firmware 120 to offload 306 any tasks being performed or scheduled to be performed at the GPU and transitions the firmware state register for the corresponding operating system to OFFLOADING 307. During offloading, all subsequent commands from the operating system are ignored and its configuration data is cleared. When offloading is complete, the firmware state register will revert to READY 303. To resume normal activity, the GPU driver will have to go through the driver initialization stage 402 again to effectively restore the connection to the GPU firmware 120.

All of the operating systems may be subject to the same watchdog mechanism, including the host operating system. In some examples, the same timer value may be written into each of the firmware timer registers for all of the operating systems. In some examples, a different timer value may be written into each of the firmware timer registers—e.g. the watchdog may write timer values into the firmware timer registers in turn according to some predefined schedule. In some examples, the periods according to which the watchdog writes in the timer value to the firmware timer register and reads back the timer value from the OS return register may differ for different operating systems—for example, the periods could be set by the GPU driver of an operating system.

In some examples the firmware may copy the GPU timer value to the firmware timer register at a frequency multiple of the periodicity at which the OS return register is copied and written by the GPU driver. In this scenario the firmware may compare the value in the OS return register with the current value of the GPU timer, to obtain an approximate time period since the GPU driver last updated the OS return register. The firmware may then use this value to decide whether the host has gone offline. Furthermore in systems where a heavy load on the OS under which the GPU driver is running could cause timing variations in the GPU driver's update of the OS return register, the firmware could adjust its notion of the minimum allowed response time period based on some heuristic factor, such as the frequency of command submission by the GPU driver.

In some examples, the watchdog is configured to only monitor operating systems according to the above process when that operating system has tasks scheduled for processing at the GPU—e.g. when the operating system has tasks in its queue at the GPU. This avoids the watchdog assuming a GPU driver is unresponsive when the driver or the operating system it is supported at is in a low power state.

It will be appreciated that various modifications are possible to the particular state diagrams shown in FIGS. 3 and 4 whilst maintaining independent state registers for each operating system comprising a firmware state register managed by the GPU firmware and indicating whether the GPU is online, and an OS state register managed by the GPU driver of the respective operating system and indicating whether that GPU driver is online. The GPU driver is online when it has loaded and is operable to submit tasks to the GPU for processing.

Figure 6:
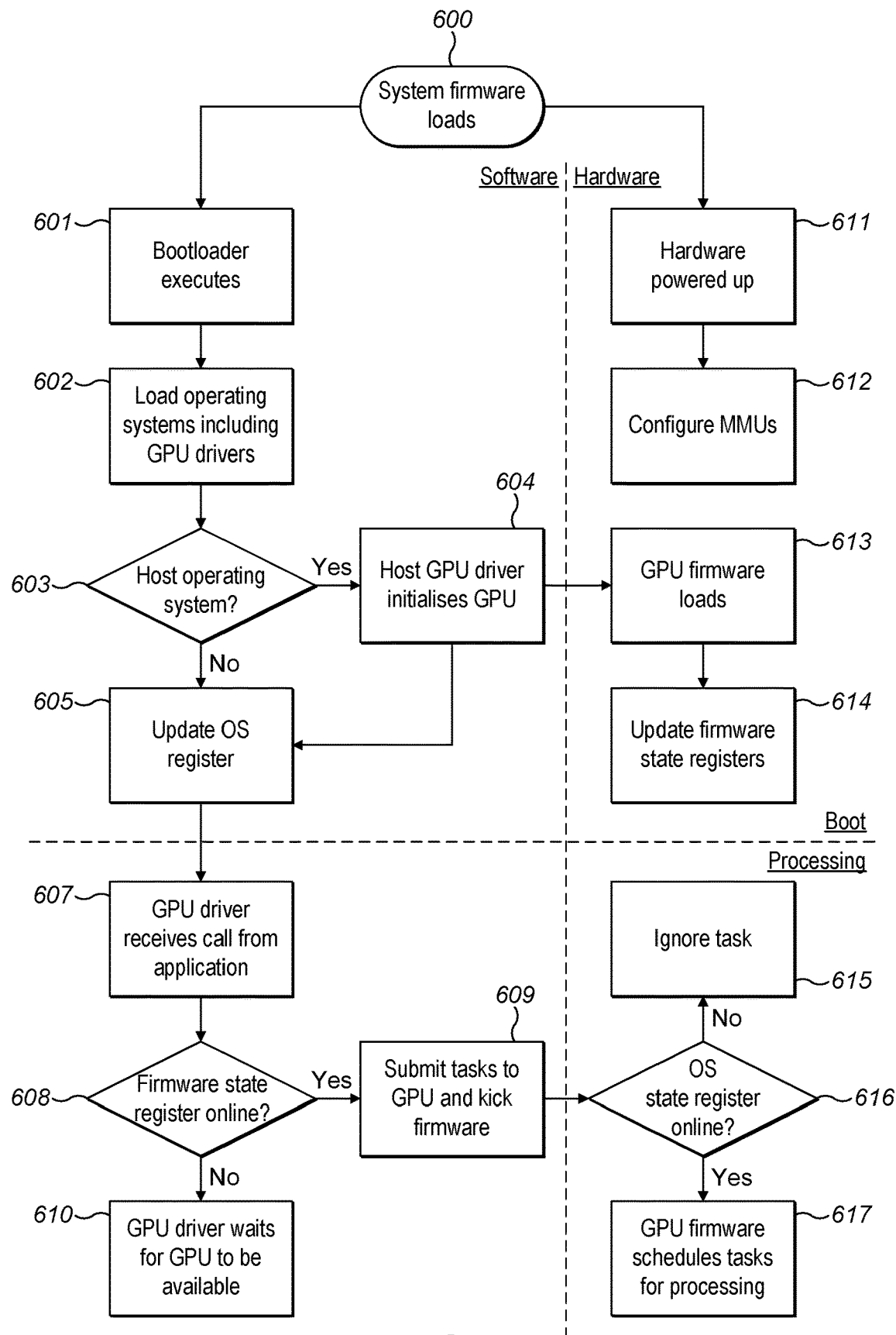
FIG. 6 is a flowchart illustrating the bootup of a computer system configured in accordance with the principles described herein.

An exemplary bootup process for the computer system of FIG. 1 is shown in FIG. 6. At power up of the computer system, the system firmware 126 loads and the various hardware devices of the system power up 611. Each hardware device will typically perform some self-configuration steps at power up, such as loading firmware, initialising registers, performing memory checks etc. The system firmware (e.g. a BIOS or UEFI) causes a bootloader to execute at the CPU 601. The bootloader loads the operating systems 602. The operating systems may be loaded according to a predefined sequence—for example, the host operating system which comprises the host GPU driver may be loaded first. As each operating system loads, the steps performed by its GPU driver depend on whether or not the GPU driver is the host GPU driver.

In the present example, each GPU driver determines 603 whether it is the host GPU driver—for example, by checking whether it has access the main registers 123 of the GPU in the manner described above. In other examples, no explicit check is performed by the GPU drivers and one of the GPU drivers is predefined as the host GPU driver—for example, by means of a flag set in its configuration parameters which indicate that the GPU driver is to configure itself in host mode. The host GPU driver is configured to initialise the GPU 604 by configuring the main registers 123 of the GPU and causing the GPU to load 613 its firmware 120. The GPU firmware updates the firmware state registers 614 provided for each operating system so as to indicate that the GPU firmware is online. The host GPU driver also updates its OS state register 605 so as to indicate that it is online. The non-host GPU drivers update their respective OS state registers 605 so as to indicate that they are online.

Figure 8:
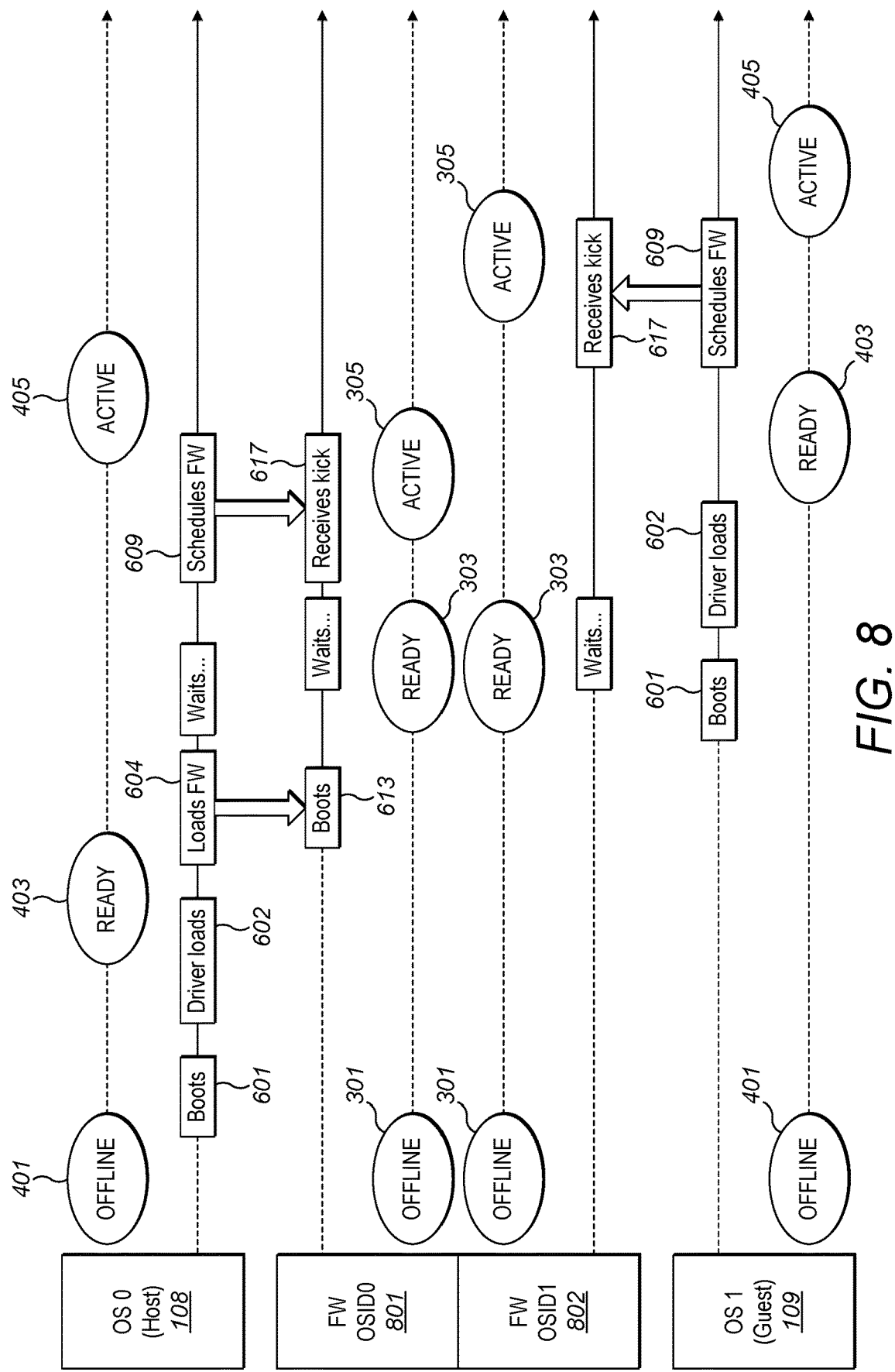
FIG. 8 is a timeline illustrating bootup of a computer system configured in accordance with the principles described herein.

FIG. 8 shows the bootup process of the computer system as a timeline which relates the steps shown in the flowchart of FIG. 6 to the state diagrams of FIGS. 3 and 4. In FIG. 8, the interactions of the host operating system 108 and the guest operating system 109 with their respective firmware state registers 801 and 802 are illustrated. Initially, the OS state registers of both the host OS and the guest OS are in the OFFLINE state 401. The host OS boots 601 and the host GPU driver loads 602. On the driver loading, the host updates its OS state register to READY 403. The driver also causes 604 the GPU firmware to boot 613. In response, the firmware loads and updates its firmware state registers for all OSes to READY state 303.

The guest OS 109 boots 601 and its GPU driver loads 602 and updates its OS state register to READY 403. The guest OS does not however initialise the GPU firmware since this is handled by the host GPU driver.

When the host or guest operating systems wish to submit one or more first tasks to the GPU for processing, the respective GPU driver schedules the tasks for processing 609 and kicks the firmware 617 (e.g. by writing to a respective kick register at the firmware in the manner described herein). In response, the respective firmware state register is updated to its ACTIVE state 305. The firmware state registers stay in this state until, for example, the respective GPU driver unloads or crashes, or the GPU is reinitialised.

Figure 9:
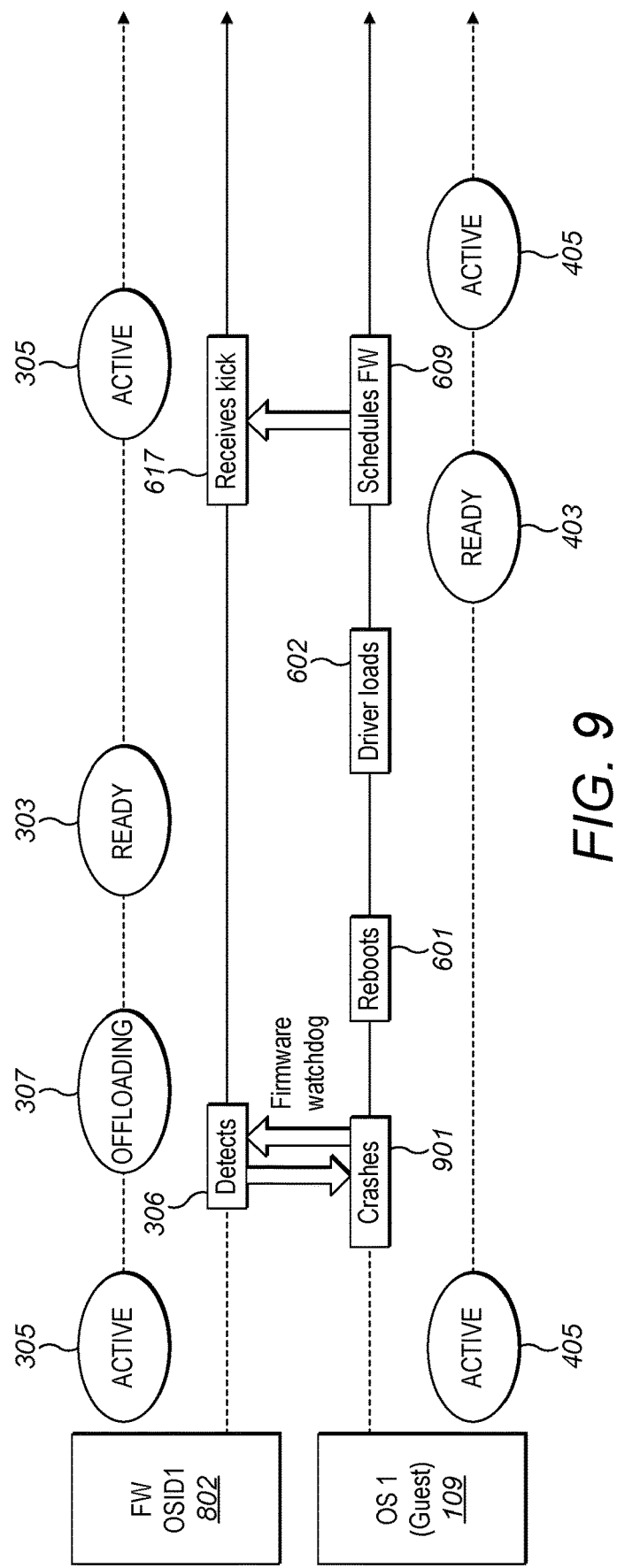
FIG. 9 is a timeline illustrating the crash of a guest OS in a computer system configured in accordance with the principles described herein.

FIG. 9 shows a timeline illustrating the operation of the computer system in response to guest OS 109 crashing. The OS state register for guest OS 109 is initially in its ACTIVE state 405. The firmware state register 802 corresponding to guest OS 109 is initially in its ACTIVE state 305 as a result of the GPU having processed tasks for the guest OS 109. Watchdog 129 is running at the firmware and detects 306 when the guest OS/its GPU driver becomes unresponsive 901. This may be performed in accordance with the principles described herein with respect to FIG. 5. In response to detecting that the guest OS/its GPU driver are unresponsive, the firmware offloads (e.g. clears up the state data relating to the guest OS) and its state register is set to OFFLOADING 307. Once offloading is complete, the firmware updates its state register to READY 303.

When the guest OS recovers and reboots 601, the GPU driver again loads 602 and updates its OS state register to READY state 403. When the guest OS again has one or more first tasks to submit to the GPU for processing, the respective GPU driver schedules those tasks at the GPU 609 and kicks the firmware 617. The firmware then processes the kick and updates the firmware state register to ACTIVE 305. In response, the respective GPU driver updates its OS state register to ACTIVE 405.

Figure 10:
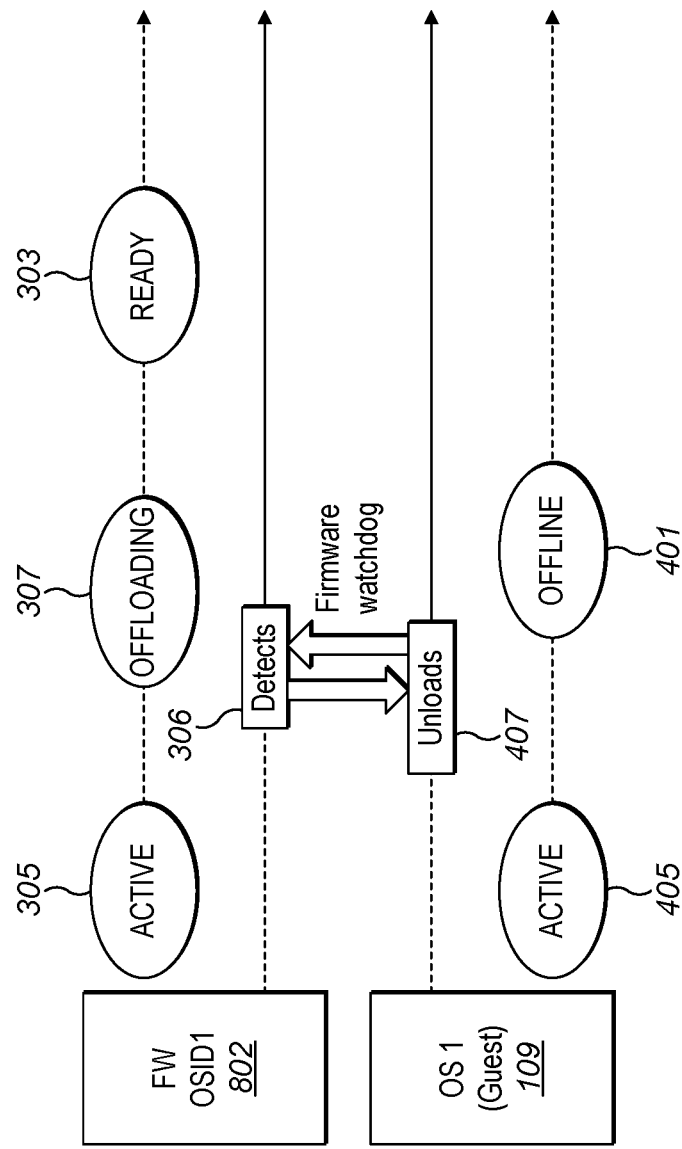
FIG. 10 is a timeline illustrating shutdown of a computer system configured in accordance with the principles described herein.

FIG. 10 shows a timeline illustrating the shutdown of the computer system. The OS state register for guest OS 109 and the firmware state register 802 are initially in their ACTIVE states 405, 305. At shutdown of the guest OS 109, the GPU driver unloads 407 and updates its state to OFFLINE 401. In the example shown in FIG. 10, the watchdog 129 at the firmware detects 306 the GPU driver has become unresponsive and in response offloads the state data for guest OS 109. The firmware updates its state register for the guest OS to OFFLOADING 307 and, when offloading is complete, returns its state to READY 303. In this manner, the firmware can detect when the guest OS has shutdown without the guest OS needing to signal to the firmware that it is shutting down. In other examples, the guest OS may signal to the firmware this it is shutting down so as to cause the firmware to offload the state data for the guest OS and return its firmware state register to the READY state.

Once the GPU drivers at the operating systems and the GPU firmware are online and their respective registers have been updated accordingly, the bootup process is complete for the GPU and its software agents.

In order to submit tasks for processing at the GPU, an application running at an operating system will typically make one or more software calls 607 (e.g. draw calls) to the GPU driver at the operating system. The GPU driver determines whether its respective firmware state register indicates that the GPU firmware is online 608. If not, then the GPU driver waits 610 for the firmware GPU to become available. In some examples the GPU driver may return an error to the application at this stage. If the GPU firmware is online, then the GPU driver submits the tasks to the GPU for processing 609 and writes to the kick register at the GPU. The GPU firmware determines 616 whether the corresponding OS state register indicates that the GPU driver from which the task originates is online. If so, the GPU firmware schedules the task for processing 617 at the graphics engines 119. If not, the task is ignored 615 and so is not processed at the GPU.

The computer system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a computer system need not be physically generated by the computer system at any point and may merely represent logical values which conveniently describe the processing performed by the computer system between its input and output.

The CPU and GPU described herein may be embodied in hardware on one or more integrated circuits. The computer system described herein may be configured to perform any of the methods described herein. Unless otherwise specified, the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor to perform the tasks specified by the code.

A processor may be any kind of device, machine or dedicated circuit, or collection or portion thereof, with processing capability such that it can execute instructions. A processor may be any kind of general purpose or dedicated processor, such as a System-on-chip, an application-specific integrated circuit (ASIC), a programmable logic array, a field-programmable gate array (FPGA), or the like. A computing system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a computer system configured to perform any of the methods described herein, or to manufacture a computer system as described herein. An integrated circuit definition dataset may be, for example, an integrated circuit description.

There may be provided a method of manufacturing, at an integrated circuit manufacturing system, a computer system as described herein. There may be provided an integrated circuit definition dataset that, when processed in an integrated circuit manufacturing system, causes the method of manufacturing a computer system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computer system will now be described with respect to FIG. 7.

Figure 7:
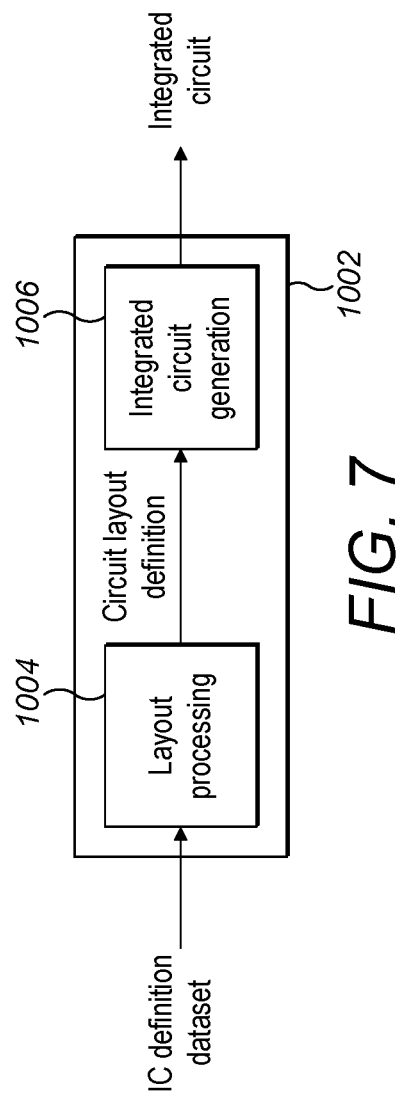
FIG. 7 is a schematic diagram of an integrated circuit manufacturing system.

FIG. 7 shows an example of an integrated circuit (IC) manufacturing system 1002 which is configured to manufacture a computer system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a computer system as described in any of the examples herein), process the IC definition dataset, and generate an IC according to the IC definition dataset (e.g. which embodies a computer system as described in any of the examples herein). The processing of the IC definition dataset configures the IC manufacturing system 1002 to manufacture an integrated circuit embodying a computer system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computer system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The graphics processing unit described herein may be embodied in hardware on an integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer system comprising:
   a plurality of operating systems, each operating system including a GPU driver;
   a graphics processing unit (GPU) including GPU firmware for controlling the execution of tasks at the graphics processing unit and, for each operating system:
      a firmware state register modifiable by the GPU firmware and indicating whether the GPU firmware is online; and
      an OS state register modifiable by the GPU driver of the respective operating system and indicating whether the GPU driver is online;
   and
   a memory management unit configured to mediate access to the registers of the GPU such that each operating system can access its respective registers but not those of other operating systems;
   wherein:
   one of the GPU drivers at the plurality of operating systems is a host GPU driver configured to initialise the GPU and bring the GPU firmware online;
   each GPU driver is configured to submit tasks for processing at the GPU only if its respective firmware state register indicates that the GPU firmware is online; and
   the GPU is configured to process tasks for an operating system if the respective OS state register of that operating system indicates that the GPU driver is online.

2. The computer system of claim 1, wherein, responsive to its initialisation, the GPU firmware is configured to modify the firmware state registers to indicate to the operating system that the GPU firmware is online.

3. The computer system of claim 1, wherein each GPU driver is configured to, on loading at its operating system, modify its respective OS state register at the GPU to indicate that the GPU driver is online.

4. The computer system of claim 1, wherein, on loading at its operating system, the host GPU driver is configured to initialise the GPU firmware if its respective firmware state register indicates that the GPU firmware is not online.

5. The computer system of claim 1, wherein, on loading at its operating system, the host GPU driver is configured not to initialise the GPU firmware if its respective firmware state register indicates that the GPU firmware is online.

6. The computer system of claim 1, wherein each GPU driver has write access to its respective OS state register and the GPU firmware has read but not write access to the OS state registers.

7. The computer system of claim 1, wherein the GPU firmware has write access to the firmware state registers and the GPU drivers have read but not write access to the firmware state registers.

8. The computer system of claim 1, wherein all of the GPU drivers of the plurality of operating systems are identical drivers, each operable in a host mode as the host GPU driver or a non-host mode in which the GPU driver is not configured to initialise the GPU.

9. The computer system of claim 1, wherein the GPU further comprises a kick register and a work queue for each of the plurality of operating systems, and each GPU driver is configured to write to its respective kick register when the GPU driver submits one or more tasks to its work queue.

10. The computer system of claim 1, the GPU having access to a timer and further comprising a watchdog process and, for each operating system, a firmware timer register and a OS return register, wherein:
   the watchdog process is configured to, for each operating system, periodically write the timer value into the firmware timer register;
   the GPU driver is configured to periodically copy the timer value in the firmware timer register into the OS return register; and
   the watchdog process is configured to, for each operating system, compare the OS return register to the firmware timer register so as to determine whether that operating system is online.

11. The computer system of claim 10, wherein, if the watchdog process determines that the operating system is not online, the GPU firmware ignores any tasks scheduled for processing at the GPU for that operating system.

12. The computer system of claim 10, wherein the watchdog process is configured to perform its writing and comparing steps in respect of an operating system only while that operating system has tasks in a queue for processing at the GPU.

13. The computer system of claim 1, wherein the memory management unit is configured to additionally provide the host GPU driver with access to a set of configuration registers of the GPU and the host GPU driver is configured to initialise the GPU by writing to the configuration registers.

14. The computer system of claim 1, wherein the computer system does not include a software communication channel between the plurality of operating system instances or a software communication channel between the operating systems and the GPU.

15. The computer system of claim 1, further comprising a central processing unit (CPU) arranged to support the plurality of operating systems.

16. The computer system of claim 1, wherein the computer system does not include a hypervisor or virtual machine manager for the plurality of operating systems.

17. The computer system of claim 1, wherein the number of operating systems in the plurality of operating systems is limited to the number of available pairs of firmware host registers and OS state registers at the GPU.

18. A method of booting a computer system which includes a central processing unit (CPU) for supporting a plurality of operating systems each including a GPU driver and a graphics processing unit (GPU) comprising GPU firmware for controlling the execution of tasks at the graphics processing unit and, for each operating system, a firmware state register modifiable by the GPU firmware and an OS state register modifiable by the GPU driver of the respective operating system, the method comprising:
- causing the plurality of operating systems to load at the CPU;
- configuring one or more memory management units of the computer system so as to allow each operating system to access its respective firmware and OS state registers at the GPU but not those of other operating systems;
- responsive to loading at its respective operating system, each GPU driver updating its respective OS state register at the GPU so as to indicate that the GPU driver is online;
- one of the GPU drivers at the plurality of operating systems acting as a host GPU driver by initialising the GPU so as to load the GPU firmware at the GPU; and
- responsive to loading at the GPU, the GPU firmware updating its firmware state register for each operating system so as to indicate that the GPU firmware is online;

wherein:
- each GPU driver is configured to submit tasks for processing at the GPU only if its respective firmware state register indicates that the GPU firmware is online; and
- the GPU is configured to process tasks for an operating system only if the respective OS state register of that operating system indicates that the GPU driver is online.

19. The method of claim 18, wherein the configuring the one or more memory management units includes granting access to configuration registers of the GPU to one of the plurality of operating systems, each GPU driver is configured to, on loading at its operating system, determine whether it has access to the configuration registers, and, if a GPU driver has access to the configuration registers, that GPU driver configuring itself in host mode as the host GPU driver.

20. A non-transitory computer readable storage medium having stored thereon a computer readable dataset description of an integrated circuit that, when processed in an integrated circuit manufacturing system, causes the integrated circuit manufacturing system to manufacture a computer system comprising:
- a plurality of operating systems, each operating system including a GPU driver;
- a graphics processing unit (GPU) including GPU firmware for controlling the execution of tasks at the graphics processing unit and, for each operating system:
  - a firmware state register modifiable by the GPU firmware and indicating whether the GPU firmware is online; and
  - an OS state register modifiable by the GPU driver of the respective operating system and indicating whether the GPU driver is online;

and
- a memory management unit configured to mediate access to the registers of the GPU such that each operating system can access its respective registers but not those of other operating systems;

wherein:
- one of the GPU drivers at the plurality of operating systems is a host GPU driver configured to initialise the GPU and bring the GPU firmware online;
- each GPU driver is configured to submit tasks for processing at the GPU only if its respective firmware state register indicates that the GPU firmware is online; and
- the GPU is configured to process tasks for an operating system if the respective OS state register of that operating system indicates that the GPU driver is online.

* * * * *